(12) United States Patent
Duma et al.

(10) Patent No.: US 10,465,602 B2
(45) Date of Patent: Nov. 5, 2019

(54) SYSTEM AND METHOD FOR MANAGING ZERO PEDAL MANEUVER IN HYBRID POWERTRAIN HAVING A VARIABLE-GEOMETRY TURBOCHARGER

(71) Applicant: GM Global Technology Operations LLC, Detroit, MI (US)

(72) Inventors: Flavia Duma, Piemonte (IT); Roberto Romanato, Settimo Torinese (IT); Paolo Pasero, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 15/945,246

(22) Filed: Apr. 4, 2018

(65) Prior Publication Data
US 2019/0309677 A1  Oct. 10, 2019

(51) Int. Cl.
| | |
|---|---|
| *B60L 9/00* | (2019.01) |
| *F02B 37/24* | (2006.01) |
| *B60W 10/06* | (2006.01) |
| *B60W 10/08* | (2006.01) |
| *B60W 30/192* | (2012.01) |
| *B60W 20/19* | (2016.01) |
| *B60K 6/485* | (2007.10) |
| *B60W 30/18* | (2012.01) |

(52) U.S. Cl.
CPC .............. *F02B 37/24* (2013.01); *B60K 6/485* (2013.01); *B60W 10/06* (2013.01); *B60W 10/08* (2013.01); *B60W 20/19* (2016.01); *B60W 30/18072* (2013.01); *B60W 30/192* (2013.01); *B60W 2540/10* (2013.01); *B60W 2540/12* (2013.01)

(58) Field of Classification Search
CPC ......... F02B 37/24; B60W 20/19; B60K 6/485
See application file for complete search history.

(56) References Cited

U.S. PATENT DOCUMENTS

| | | | |
|---|---|---|---|
| 2017/0021824 A1* | 1/2017 | Johri | B60W 20/19 |
| 2018/0283267 A1* | 10/2018 | Xiao | F02D 41/0007 |
| 2018/0283268 A1* | 10/2018 | Xiao | F02B 37/14 |
| 2019/0176801 A1* | 6/2019 | Ruybal | B60W 20/12 |

* cited by examiner

*Primary Examiner* — Adam M Alharbi
(74) *Attorney, Agent, or Firm* — Quinn IP Law

(57) ABSTRACT

A hybrid powertrain includes an internal combustion engine having a crankshaft rotating at an engine speed, and a variable-geometry turbocharger (VGT) having a compressor and a turbine. The turbine has turbine vanes, and is configured to rotate in response to exhaust flow from the engine to thereby rotate the compressor. An electric machine is configured to selectively deliver motor torque to the crankshaft upon completion of a predetermined operating mode of the powertrain. The engine and electric machine have a corresponding speed that is responsive to acceleration and braking requests. A controller executes a method in which the controller coordinates vane position of the turbine vanes with the motor torque of the electric machine in response to engine speed, doing so during a zero pedal maneuver in which the acceleration and braking requests are both zero.

18 Claims, 2 Drawing Sheets

SYSTEM AND METHOD FOR MANAGING ZERO PEDAL MANEUVER IN HYBRID POWERTRAIN HAVING A VARIABLE-GEOMETRY TURBOCHARGER

INTRODUCTION

Powertrains may include an internal combustion engine having a turbocharger which compresses intake airflow upstream of the engine's intake manifold. Operation of the turbocharger forces additional oxygen into combustion chambers of the engine. Within the turbocharger, a turbine may be coaxially coupled to a compressor. Exhaust flow from the engine passing through the turbine acts on vanes disposed within the turbine, which in turn causes the turbine and compressor to rotate. Operation of the compressor ultimately increases the engine's overall power and efficiency.

As used in the art, the term "aspect ratio" refers to the ratio of an area of a spiral cone-shaped inlet to the above-noted turbine, i.e., a turbine volute, to a radius from an impeller located at the center of the turbine. The aspect ratio ultimately affects the turbocharger's power output response. Delays in such a response, referred to as "turbo lag", may manifest as a delayed throttle response during periods of acceleration, with turbo lag most noticeable at low engine speeds and under low engine loads. Variable-geometry turbocharger (VGT) assemblies have moveable turbine vanes whose positions within the turbine are adjustable in real-time. Changing the vane position based on engine speed ultimately changes the aspect ratio. The ability to adjust the aspect ratio in real-time via a VGT thus increases the engine's overall operating efficiency relative to turbochargers having a fixed aspect ratio.

SUMMARY

A hybrid powertrain is disclosed herein that includes a VGT assembly with adjustable turbine vanes, an electric machine coupled to an internal combustion engine, and a controller. The controller is configured to coordinate vane position of the turbine vanes with a requested torque from the electric machine during a zero pedal maneuver, i.e., a period in which an acceleration request and a braking request are both zero. Such a period generally precedes a throttle tip-in maneuver, e.g., after coasting or engine start in a vehicle embodiment. The control approach disclosed herein is therefore intended to optimize efficiency and performance of the subsequent tip-in maneuver.

In a mild hybrid application in particular, the electric machine is used as a starter motor to start the engine, such as in a belt alternator starter (BAS) configuration, as opposed to acting as a traction motor providing a primary source of drive torque. The use of the present electric machine during the zero pedal maneuver may produce an undesirable drive feel, e.g., a heavy braking feel. This effect is due to increasing motor friction when a battery pack powering the electric machine is actively charging. This undesirable braking feel may manifest itself when an accelerator pedal is released and a brake pedal is not applied.

At the same time, the turbine vane positions are usually in a fully-closed position prior to throttle tip-in to ensure a more rapid torque response during the subsequent throttle tip-in event. However, fully-closed turbine vanes increase engine friction. The controller disclosed herein is therefore configured to coordinate the torque delivered to the engine by the electric machine with turbine vane position during the zero pedal maneuver, in a manner that provides a tradeoff between energy recuperation to the battery pack and drive quality, thus mitigating the heavy braking feel noted above while ensuring a faster tip-in response.

In an example embodiment as described in detail herein, the hybrid powertrain includes an internal combustion engine, e.g., a diesel engine, an electric machine, and a controller. A crankshaft of the engine rotates at engine speed. The engine includes a VGT having a compressor and a turbine coupled together via a shaft. The turbine includes adjustable or moveable turbine vanes, with the turbine rotating in response to exhaust flow from the engine passing through the turbine, which in turn causes the coupled compressor to rotate.

The electric machine selectively delivers motor torque to the crankshaft upon completion of predetermined operating mode of the powertrain, such as an engine stop event or a coasting event. The engine and electric machine have a corresponding speed responsive to acceleration and braking requests. The controller coordinates the vane position of the turbine vanes with the motor torque being output by the electric machine, doing so in response to input signals, with the input signals including the engine speed. This control action occurs during a zero pedal maneuver in which the acceleration and braking requests are both zero, e.g., when a driver of a vehicle is cruising or after an engine stop event.

The powertrain may include an accelerator pedal and a brake pedal, with the acceleration and braking requests respectively determined via the controller based on a respective measured position of the accelerator pedal and the brake pedal. Alternatively, the acceleration and braking requests may be autonomously generated by the controller.

The input signals to the controller may further include a combustion mode of the engine.

The controller is programmed in some embodiments to determine a required torque capacity of the electric machine for the tip-in maneuver, and includes a lookup table indexed by the vane position. The controller extracts a first required vane position of the turbine using the engine speed, with the first required vane position corresponding to the first required torque capacity.

The controller may determine a second required vane position corresponding to the required torque capacity being zero, e.g., 0 Nm, and then determine, via a pumping loss model, a difference in corresponding pumping losses in the VGT for each of the first and second vane positions. The controller also calculates the motor torque command for ultimate transmission to the electric machine by adding the difference in the corresponding pumping losses from the loss model to a calibrated baseline cutoff torque, with the cutoff torque being a torque value corresponding to a zero fuel feed condition of the engine, i.e., when the fuel feed to the engine's cylinders is discontinued.

The powertrain may include a transmission and drive wheels. The transmission is coupled to the engine and drive wheels in this embodiment, such that engine torque from the engine is ultimately transferred to the drive wheels via the transmission.

A method is also disclosed herein for managing a zero pedal maneuver in the above-noted hybrid powertrain. The method includes receiving input signals via a controller, including a speed of the engine, during the zero pedal maneuver. The method also includes, in response to the input signals, using the controller to coordinate a vane position of a plurality of turbine vanes of the turbine with a motor torque of the electric machine upon completion of a predetermined operating mode of the powertrain. Additionally, the method includes delivering the motor torque to a crankshaft of the engine upon the completion of the predetermined operating mode of the powertrain.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
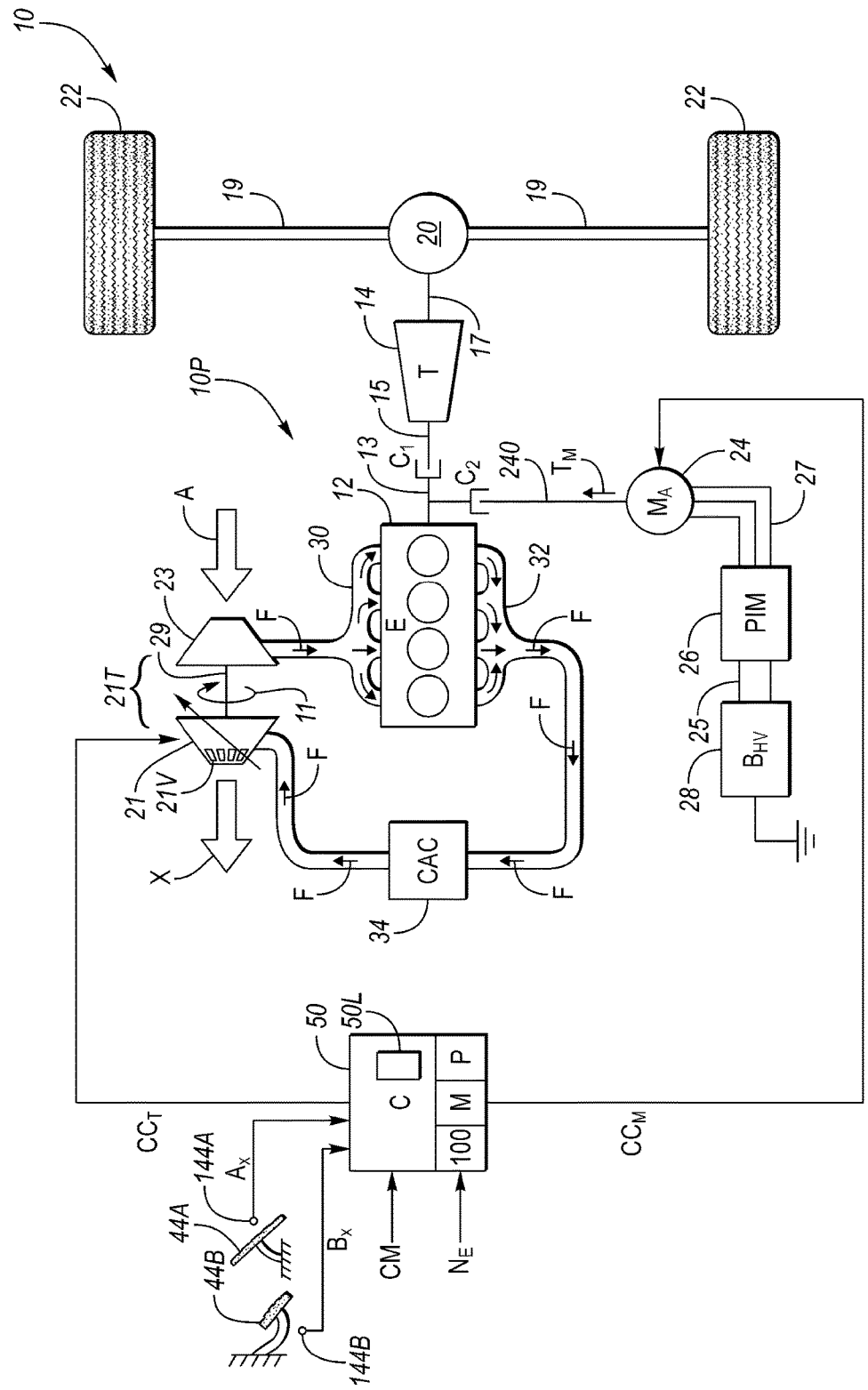
FIG. 1 is a schematic illustration of an example motor vehicle having a hybrid powertrain, with the powertrain including an electric machine coupled to an internal combustion engine, the engine having a variable-geometry turbocharger (VGT) whose operation is coordinated during a zero pedal maneuver with operation of the electric machine.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings wherein like reference numbers correspond to like or similar components throughout the several figures, a hybrid powertrain 10P is shown in FIG. 1 as part of an example motor vehicle 10 having an internal combustion engine (E) 12. The powertrain 10P may be embodied as a mild hybrid powertrain. As used herein, the term "mild hybrid" refers to a powertrain arrangement in which an electric machine ($M_A$) 24, e.g., an 18-48 volt electric traction motor, does not propel the vehicle 10 as a primary torque generator. Rather, the electric machine 24 is used to selectively assist in the overall operation of the engine 12 during certain driving maneuvers, thereby allowing the engine 12 to shut off when the vehicle 10 is coasting or at a standstill. Use of the electric machine 24 facilitates rapid restarting of the engine 12, and thus enables fuel-saving stop-start functionality.

The hybrid powertrain 10P may include a transmission (T) 14. A crankshaft 13 of the engine 12 is selectively coupled to an input member 15 of the transmission 14 via a first clutch C1, e.g., a hydrodynamic torque converter or a friction clutch. The transmission 14 transfers torque, e.g., through one or more planetary gear sets and clutches (not shown), to an output member 17. In turn, torque from the output member 17 is delivered via a differential 20 to drive axles 19, and ultimately to drive wheels 22 disposed on the drive axles 19. The transmission 14 is thus coupled to the engine 12 and to the drive wheels 22 in this embodiment, such that engine torque from the engine 12 is transferred to the drive wheels 22 via the transmission 14.

As part of the hybrid powertrain 10P described herein, the electric machine 24 may be selectively connected to the crankshaft 13 via a second clutch C2. Thus, motor torque from the electric machine 24 is transmitted from a rotor shaft 240 to the crankshaft 13 as needed to crank and start the engine 12 as part of a belt alternator starter (BAS) system. Although omitted for illustrative simplicity and clarity, those of ordinary skill in the art will appreciate that such a system may include an accessory belt, pulleys, and other drive components suitable for delivering torque assist to the engine 12, and to thereby provide additional power during launch of the vehicle 10 or other acceleration events. The electric machine 24 may also transmit torque pulses to the engine 12 as needed to help reduce noise, vibration, and harshness to improve drive quality and fuel efficiency.

The electric machine 24 may be embodied as an alternating current (AC) device as shown in a possible embodiment, and thus may be connected to a power inverter module (PIM) 26 via an AC voltage bus 27. The PIM 26 in such an embodiment is electrically connected to a high-voltage battery (BO 28 via a direct current (DC) voltage bus 25. Operation of the PIM 26, including switching control of individual semiconductor switches (not shown) via pulse width modulation or other suitable switching control techniques, ultimately enables a DC or an AC voltage to be generated, i.e., a DC voltage for recharging the battery pack 28 or an AC voltage for energizing phase windings of the electric machine 24.

A turbocharger 21T is used as part of the engine 12. The turbocharger 21T includes a variable-geometry turbine 21 and a compressor 23. The turbine 21 and the compressor 23 are coaxially coupled via a shaft 29. As a result, the turbine 21 and the compressor 23 rotate in unison. Ambient air (arrow A) compressed via operation of the compressor 23 is fed into an intake manifold 30 of the engine 12. Combustion within cylinders of the engine 12 ultimately generates post-combustion gases as a by-product of generating engine output torque, with the exhaust flow entering an exhaust manifold 32 as indicated by arrows F.

The exhaust manifold 32 may be in fluid communication with an optional charge air cooler (34), which cools the exhaust flow (arrows F) before the exhaust flow enters the VGT 21T. There, the exhaust flow (arrows F) rotates a turbine, which in turn rotates the compressor 23 due to direct coupling via the shaft 29, with rotation of the shaft 29 indicated by arrow 11. The exhaust (arrows F) ultimately discharged from the turbine 21, as indicated by arrow X, with the exhaust thereafter treated and filtered downstream by a catalyst and a particulate filter (not shown) in an example diesel fuel application.

Although omitted from FIG. 1 for illustrative simplicity, a VGT such as the VGT 21T includes a turbine mounted on the shaft 11. Exhaust flow (arrows F) discharged from the cylinders of engine 12 ultimately rotates the turbine, which is retained inside a turbine housing. A plurality of turbine vanes 21V located within the turbine 21 are moveable anywhere between and inclusive of a fully open and a fully closed position, with the vane position commanded by a controller (C) 50 as turbine control signals (arrow $CC_T$).

The controller 50 includes a processor (P) and memory (M). The memory (M) includes tangible, non-transitory memory, e.g., read only memory, whether optical, magnetic, flash, or otherwise. The controller 50 also includes application-sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

While shown schematically in FIG. 1, those of ordinary skill in the art will appreciate that various configurations are possible for the moveable turbine vanes 21V, including but not limited to a ring of airfoil-shaped vanes surrounding an inlet to the turbine 21, with position of the turbine vanes 21V varying a swirl angle of the exhaust flow (arrows F) such that changes in an area between tips of adjacent turbine vanes 21V changes an aspect ratio of the VGT 21T in real-time.

When the powertrain 10P may include an accelerator pedal 44A and a brake pedal 44B as shown, the controller 50 may be configured to determine acceleration and braking requests, and thus the presence or absence of the zero pedal maneuver noted herein, by measuring and evaluating a respective position of the accelerator pedal 44A and the brake pedal 44B, e.g., via a respective position sensor 144A and 144B. The position corresponds to a commanded amount of throttle or braking force, respectively. Alternatively, the acceleration and braking requests may be determined autonomously, e.g., by the controller 50 in an autonomous embodiment of the vehicle 10.

The controller 50 is programmed to execute instructions 100 embodying a method of coordinating operation of the VGT 21T, with operation of the turbine 21, with operation of the electric machine 24 using control logic 50L as described below with reference to FIG. 2. The controller 50 receives input signals including engine speed (arrow $N_E$), i.e., a rotational speed of the crankshaft 13, and a combustion mode (arrow CM) of the engine 12, with both values possibly being reported by an engine control unit (not shown) or determined via the controller 50.

The term "combustion mode" as used herein refers to a set of combustion parameters, such as boost pressure, exhaust gas recirculation (EGR) level or percentage, start of fuel injection and/or quantity of different fuel injections, fuel rail pressure, etc., which may be defined for different temperatures of the engine 12 and ambient conditions. In some embodiments, the controller 50 may include a default or "normal" combustion mode and one or more additional combustion modes, for example for extreme ambient conditions, one to warm up an after-treatment system (not shown) of the powertrain 10P and increase NOx removal efficiency.

The combustion mode (arrow CM) is thus determined in real time in a manner that depends on the configuration of the engine 12. Upon executing the method 100 using the control logic 50L, the controller 50 outputs two control signals: the turbine control signal (arrow $CC_T$) noted above, which commands a change in position of the turbine vanes 21V within the turbine 21 and thus affects the aspect ratio, and a motor control signal (arrow $CC_M$) to the electric machine 24 which ultimately commands delivery of a particular motor torque to the crankshaft 13.

Figure 2:
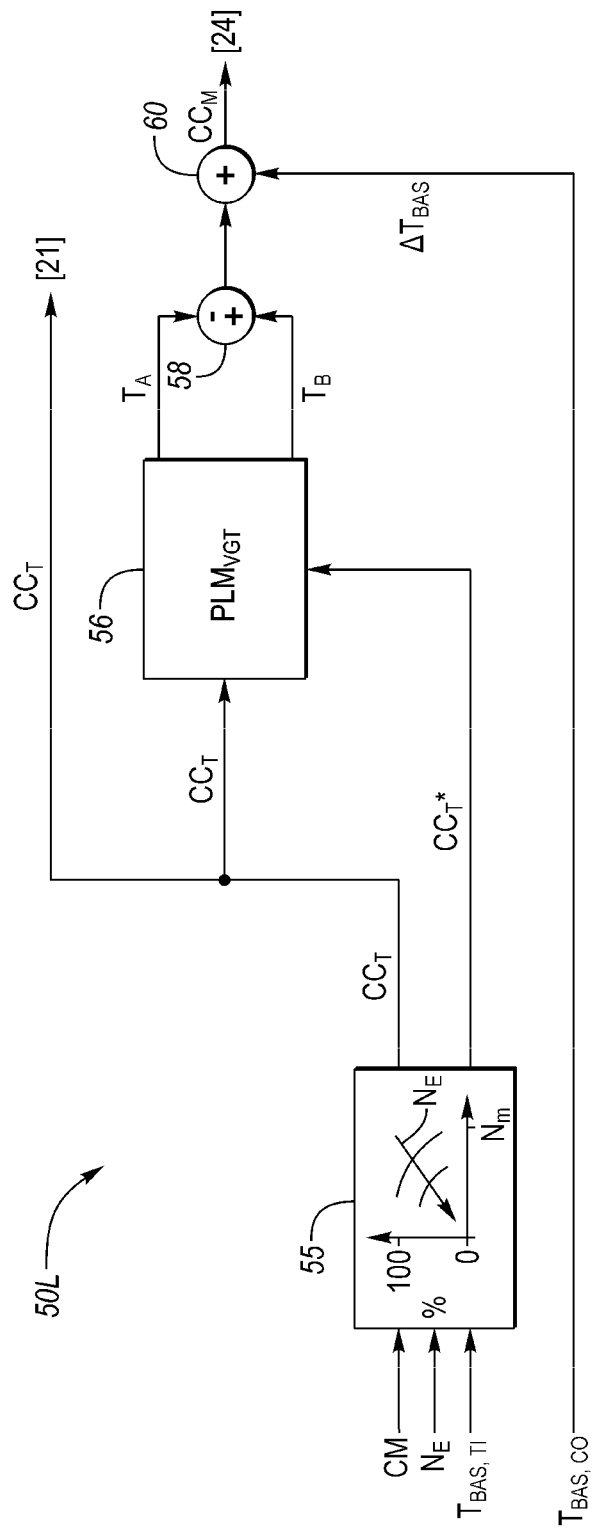
FIG. 2 is a schematic logic flow diagram for coordinating operation of the VGT and the electric machine of FIG. 1 during the above-noted zero pedal maneuver.

Referring to FIG. 2, the control logic 50L noted above is used by the controller 50 during zero pedal maneuvers to compensate for friction of the electric machine 24 when recuperating energy to the battery pack 28. The controller 50 does so by coordinating position of the turbine vanes 21V of FIG. 1 with such energy recuperation so as not to adversely affect subsequent throttle tip-in performance. In practical terms, the controller 50 ensures that the turbine vanes 21V do not open too much if torque assist from the electric machine 24 is low.

As explained further below, the controller 50, using the control logic 50L, is configured to execute a method for managing the above-noted zero pedal maneuver in the hybrid powertrain 10P of FIG. 1 or a similar system. In general, the controller 50 receives input signals, including the engine speed (arrow $N_E$). In response to such input signals during the zero pedal maneuver, the controller 50 coordinates a vane position of the plurality of turbine vanes 21T within the turbine 21 with the motor torque (arrow $T_M$) of the electric machine 24 upon completion of a predetermined operating mode of the powertrain 10P. The electric machine 24 thereafter delivers the motor torque (arrow $T_M$) to the crankshaft 13 of the engine 12 upon the completion of the predetermined operating mode of the powertrain 10P.

As noted above, control input signals include the engine speed (arrow $N_E$), and may also include the combustion mode (arrow CM). Additionally, the controller 50 of FIG. 1 is programmed to receive or determine from memory (M) a BAS torque capacity needed for tip-in, with the BAS torque capacity represented as arrow $T_{BAS,TI}$ in FIG. 2. The controller 50 includes a lookup table 55 or performance curves indexed by VGT position and BAS torque capacity. Thus, engine speed corresponds to a particular VGT position for a given BAQ torque capacity, with VGT position decreasing or increasing in conjunction with decreasing or increasing engine speed, as indicated by the direction of arrow $N_E$.

The lookup table 55 outputs the VGT position which is transmitted to the turbine 21 of FIG. 1 as the turbine control signals (arrow $CC_T$), as indicated by [21] in FIG. 2. Also, as a modified turbine control signals (arrow $CC_T^*$) the lookup table passes through a VGT position absent BAS torque capability, i.e., the corresponding VGT position for a given engine speed with 0% BAS torque capability. The turbine control signals (arrow $CC_T$) and the modified turbine control signals (arrow $CC_T^*$) are fed into a pumping loss model ($PLM_{VGT}$) 56, which is a model of pumping losses associated with friction in the turbine 21.

The outputs of model 56 are first and second motor torque commands ($T_A$ and $T_B$, respectively). The first motor torque command ($T_A$) is the pumping losses in the turbine 21 at the VGT position corresponding to the turbine control signals (arrow $CC_T$), i.e., the VGT position at the BAS torque capacity for tip-in. The second motor torque command ($T_B$) is the pumping losses in the turbine 21 at the VGT position corresponding to the modified turbine control signals (arrow $CC_T^*$), i.e., the VGT position without BAS torque capacity.

At node 58, the controller 50 of FIG. 1 calculates the difference between the first and second motor torque commands ($T_A$ and $T_B$), and feeds this value, referred to herein as the delta BAS torque ($\Delta T_{BAS}$), to a summation node 60. There, the delta BAS torque ($\Delta T_{BAS}$) is added to a calibrated baseline BAS cutoff torque (arrow $T_{BAS,CO}$), i.e., a calibrated value corresponding to a zero fuel feed condition. The output of summation node 60 is the motor torque command (arrow $CC_M$) noted above with reference to FIG. 1.

In an example illustration, both of the outputs of table 55 may be a commanded 100% open position of the turbine vanes 21V of turbine 21, with the baseline BAS cutoff torque (arrow $T_{BAS,CO}$) being 0 Nm. Pumping losses from model 56 may correspond to 72 Nm at the fully-closed vane position (100%). In this instance, the delta BAS torque ($\Delta T_{BAS}$) is 0 Nm. As a result, the electric machine 24 is not commanded on.

In another example illustration, both outputs of the table 55 may be a commanded 80% closed position of the turbine vanes 21V, with the baseline BAS cutoff torque (arrow $T_{BAS,CO}$) being 30 Nm. Pumping losses from model 56 may correspond to 20 Nm at this vane position. In this instance, the delta BAS torque ($\Delta T_{BAS}$) is once again 0 Nm. However, the electric machine 24 receives the 30 Nm baseline BAS cutoff torque (arrow $T_{BAS,CO}$) as a command from the controller 50.

In yet another example illustration, the output (arrow $CC_T$) of the table 55 may be a commanded 20% closed position of the turbine vanes 21V, the output (arrow $CC_T^*$) of the table 55 may be a commanded 80% closed position of the turbine vanes 21V, and the baseline BAS cutoff torque (arrow $T_{BAS,CO}$) may again be 30 Nm. Pumping losses from model 56 may correspond, for the respective outputs (arrows $CC_T$ and $CC_T^*$), to 5 Nm and 20 Nm at this vane position. In this instance, the delta BAS torque ($\Delta T_{BAS}$) is now 20 Nm−5 Nm=15 Nm. This 15 Nm value is added at summation node 60 to the BAS cutoff torque (arrow $T_{BAS,CO}$) of 30 Nm to generate a commanded torque of 45 Nm from via the motor control signal (arrow $CC_M$) as a command from the controller 50.

The approach detailed above, particularly in mild hybrid diesel applications or other similar applications in which the VGT 21 is used, is thus able to mitigate certain undesirable effects of zero pedal maneuvers, whether driver-based or autonomously generated. The feeling of excessive braking when releasing an accelerator pedal without pushing a brake pedal is thus reduced or eliminated. The coordinated use of the electric machine 24 with turbine vane position thus provides an optimal tradeoff between drive quality and energy recuperation of the battery pack 28.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A hybrid powertrain comprising:
    an internal combustion engine having a crankshaft rotating at an engine speed, and a variable-geometry turbocharger (VGT) having a turbine and a compressor coupled via a shaft, wherein the turbine has a plurality of turbine vanes and is configured to rotate in response to exhaust flow from the engine to rotate the compressor;
    an electric machine configured to deliver motor torque to the crankshaft upon completion of a predetermined operating mode of the powertrain, wherein the engine and the electric machine have corresponding speeds that are responsive to acceleration and braking requests; and
    a controller configured to coordinate a vane position of the plurality of turbine vanes with the motor torque of the electric machine, in response to input signals including the engine speed, during a zero pedal maneuver in which the acceleration and braking requests are both zero.

2. The hybrid powertrain of claim 1, wherein the predetermined operating mode is an auto stop event of the engine.

3. The hybrid powertrain of claim 1, wherein the engine is a diesel engine.

4. The hybrid powertrain of claim 1, further comprising: an accelerator pedal and a brake pedal, wherein the acceleration and braking requests are respectively determined via the controller based on a position of the accelerator pedal and the brake pedal.

5. The hybrid powertrain of claim 1, wherein the acceleration and braking requests are autonomously generated by the controller.

6. The hybrid powertrain of claim 1, wherein the input signals to the controller further include a combustion mode of the engine.

7. The hybrid powertrain of claim 1, wherein the controller is programmed to determine a required torque capacity of the electric machine for a tip-in maneuver corresponding to the completion of a predetermined operating mode, the controller including a lookup table indexed by the vane position, and wherein the controller is configured to extract a first required vane position, using the engine speed, that corresponds to the required torque capacity.

8. The hybrid powertrain of claim 7, wherein the controller is configured to determine a second required vane position corresponding to the required torque capacity being 0 Nm, and to determine, via a pumping loss model, a difference in corresponding pumping losses in the VGT for each of the first and second vane positions, and to calculate the motor torque command by adding the difference in the corresponding pumping losses to a calibrated baseline cutoff torque value corresponding to a zero fuel feed condition of the engine.

9. The hybrid powertrain of claim 1, further comprising a transmission and a set of drive wheels, wherein the transmission is coupled to the engine and to the drive wheels such that engine torque from the engine is transferred to the drive wheels via the transmission.

10. A method for managing a zero pedal maneuver in a hybrid powertrain having an electric machine, a variable-geometry turbocharger (VGT), and an engine, the VGT having a turbine configured to rotate in response to exhaust flow from the engine to thereby rotate a compressor of the VGT, wherein the engine and the electric machine have a corresponding speed that is responsive to acceleration and braking requests, the method comprising:
    receiving input signals via a controller, including a speed of the engine; and
    during the zero pedal maneuver, in which the acceleration and braking requests are both zero, using the controller to coordinate a vane position of a plurality of turbine vanes of the turbine with a motor torque of the electric machine upon completion of a predetermined operating mode of the powertrain in response to the input signals; and
    delivering the motor torque to a crankshaft of the engine upon the completion of the predetermined operating mode of the powertrain.

11. The method of claim 10, wherein the predetermined operating mode is an auto stop event of the engine.

12. The method of claim 10, wherein the engine is a diesel engine.

13. The method of claim 10, the hybrid powertrain having an accelerator pedal and a brake pedal, the method further comprising: determining the acceleration and braking requests via the controller based on a position of the accelerator pedal and the brake pedal.

14. The method of claim 10, further comprising: generating the acceleration and braking requests autonomously via the controller.

15. The method of claim 10, wherein the input signals further include a combustion mode of the engine.

16. The method of claim 10, further comprising: determining a required torque capacity of the electric machine for a throttle tip-in maneuver commencing at the completion of the predetermined operating mode, the controller having a lookup table indexed by the vane position; and
- extracting, via the controller, a first required vane position using the engine speed, the first required vane position corresponding to the required torque capacity.

17. The method of claim 16, further comprising: determining a second required vane position via the controller, the second required vane position corresponding to the required torque capacity being 0 Nm;
- determining, using a pumping loss model, a difference in corresponding pumping losses in the VGT for each of the first and second vane positions; and
- calculating the motor torque command via the controller by adding the difference in the corresponding pumping losses to a calibrated baseline cutoff torque value corresponding to a zero fuel feed condition of the engine.

18. The method of claim 17, the hybrid powertrain including a transmission coupled to the engine and to a set of drive wheels, the method further comprising: transferring engine torque from the engine to the drive wheels via the transmission after delivering the motor torque to the crankshaft of the engine.

* * * * *